Feb. 18, 1930.  C. WEISS  1,747,960
BUS SEAT SWITCH
Filed June 17, 1926
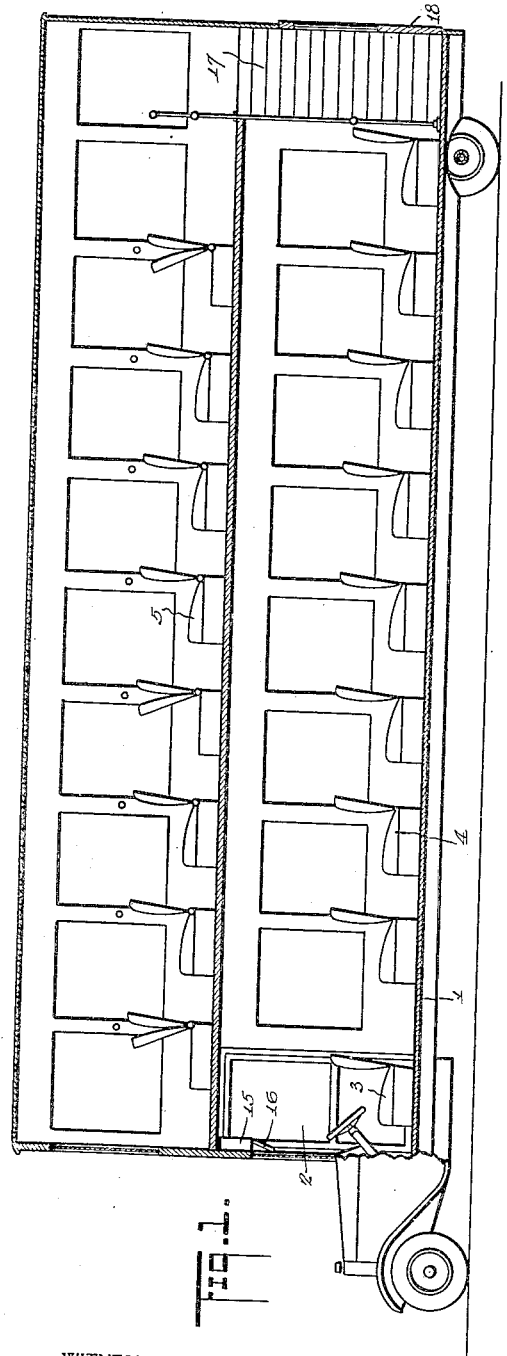
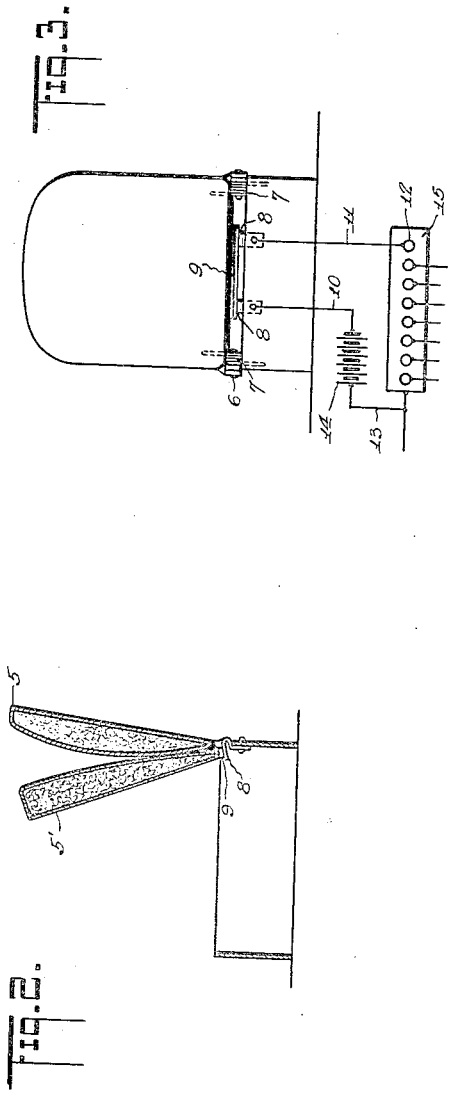
INVENTOR
Charles Weiss.
BY
ATTORNEYS Patented Feb. 18, 1930

1,747,960

UNITED STATES PATENT OFFICE

CHARLES WEISS, OF NEW YORK, N. Y.

BUS SEAT SWITCH

Application filed June 17, 1926. Serial No. 116,653.

This invention relates to vehicles and particularly to an improved bus, the object being to provide an improved construction wherein the driver may act in the double capacity of driver and conductor.

Another object of the invention is to provide a passenger bus provided with a double deck and formed with an inside stairs whereby a front entrance may be provided and, consequently, all the passengers are compelled to move by the driver in entering and leaving.

A still further object of the invention is to provide a double deck passenger bus wherein signal means are associated with each seat, the arrangement being such that when any seat is unoccupied it is automatically moved so as to cause the signalling mechanism to function to indicate what seat is vacant.

In the accompanying drawing—

Figure 1 is a longitudinal vertical sectional view through a bus disclosing an embodiment of the invention.

Figure 2 is an enlarged fragmentary sectional view showing a seat provided with a switch embodying certain features of the invention.

Figure 3 is a rear view of the seat shown in Figure 2 with a diagram associated therewith illustrating a circuit embodying certain features of the invention.

Referring to the accompanying drawing by numerals, 1 indicates the body of a bus, which body may be formed in any desired manner provided it is supplied with a front door 2 near the driver's seat 3. A number of seats 4 are arranged on the lower deck of the bus, said seats being of any desired kind and substantially similar seats 5 arranged on the upper deck. However, the seats 5 have seat sections which are normally raised as each seat is provided with a hinged structure 6 (Figures 2 and 3) and with springs 7 for normally holding the seats elevated as shown in Figure 3. A pair of resilient substantially U-shaped contact plates 8 are connected to the lower part of each seat 5 and are positioned to be engaged by the connector or contact plate 9 which is secured to the seat bottom or seat section 5'. This structure is found on each seat and the respective contacts 8 and 9 in each seat, coact with wires 10 and 11 for connecting the respective seats to the respective signalling devices 12 and to the common return 13 which is inserted into the battery circuit 14. The signalling devices 12 may be lamps, bells, shutters or other structures which are electrically operated whenever a seat on the upper deck becomes vacant. The various signalling devices 12 are carried by a suitable support 15, which support is mounted above and in front of the driver's seat 3 whereby he may readily observe the signals and thereby know just how many vacant seats there may be found on the upper deck. A mirror 16 properly placed is provided for the lower deck whereby the driver may readily see how many vacant seats there are on the lower deck. With this knowledge, the driver will permit only sufficient passengers to enter through door 2 to occupy all of the seats.

From Figure 1 it will be noted that there is provided an indoor stair 17. This indoor stair is of importance in that no one can enter the upper deck of the bus without passing through door 2. Also, no one can leave the upper deck of the bus and step off the bus without passing in a reverse direction through the door 2. The structure by reason of these details, is what may be known as a double deck one-man bus. One man controls the propelling mechanism and also regulates the entrance and exit of passengers as well as collects all fares. As indicated in Figure 1, some of the seats are shown lowered while others are shown raised, the raised ones indicating that they are unoccupied and this indication is registered by the devices 12 as the various contacts 8 are engaging their various contacts 9. In case a passenger should sit down on one of the raised seats, said seat would immediately move downwardly to a horizontal position which would cause the contacts 9 to move upwardly and away from the contacts 8 whereupon the particular signal 12 connected therewith will be deprived of current. The driver, therefore, can readily observe at all times the number of vacancies in the upper deck through the use of the signalling devices 12 and can see at all times the number of vacancies in the lower deck by reason of the mirror 16. Arranged adjacent the stairs 17 is an emergency door 18, which may be of any desired structure and which may be opened from the interior whenever desired.

What I claim is:

In a device of the character described, a series of seats, each seat having a swingable bottom, a spring for normally swinging the bottom to a raised position, a substantially straight contact bar carried by said bottom, said bar being connected to the seat near the rear edge thereof, said bar extending from near one side to near the other side of the bottom, and a pair of substantially U-shaped resilient contacts carried by said seat and coacting with said contact bar, the U-shaped contacts being spaced apart with one end of each contact rigidly secured to the seat, while the free end extends into the path of movement of said contact bar for providing a sliding and resilient contact, said bar and said U-shaped contacts being so associated that when said bottom is raised by said spring the bar will leave the free end of said U-shaped contacts, and when the bottom is lowered the bar will be brought into a sliding contact therewith.

CHARLES WEISS.